(12) United States Patent
Tanaka

(10) Patent No.: US 6,345,046 B1
(45) Date of Patent: Feb. 5, 2002

(54) RECEIVER AND DEMODULATOR APPLIED TO MOBILE TELECOMMUNICATIONS SYSTEM

(75) Inventor: Toyohisa Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/619,763

(22) Filed: Jul. 19, 2000

Related U.S. Application Data

(63) Continuation of application No. PCT/JP98/05215, filed on Nov. 19, 1998.

(51) Int. Cl.⁷ ............................................... H04J 13/02
(52) U.S. Cl. ...................... 370/342; 370/479; 375/349
(58) Field of Search ................................ 370/335, 342, 370/351, 441, 479; 375/140, 144, 147, 148, 260, 316, 349, 350, 371

(56) References Cited

U.S. PATENT DOCUMENTS

| | | | | |
|---|---|---|---|---|
| 5,889,815 A | * | 3/1999 | Iwakiri | 375/349 |
| 5,970,084 A | * | 10/1999 | Honda | 375/349 |
| 6,269,075 B1 | * | 7/2001 | Tran | 375/349 |

FOREIGN PATENT DOCUMENTS

| | | |
|---|---|---|
| JP | 2-90743 | 3/1990 |
| JP | 9-74372 | 3/1997 |
| JP | 10-107723 | 4/1998 |

\* cited by examiner

Primary Examiner—Huy D. Vu
(74) Attorney, Agent, or Firm—Oblon, Spivak, McClelland, Maier & Neustadt, P.C.

(57) ABSTRACT

A receiver applied to a mobile communications system which allows reduction of circuit scale is provided. Each of a plurality of fingers has a phase estimator. The phase estimator determines a phase estimate based on demodulated signals restored via a despreading section. The phase estimate is given to a compensation coefficient operation section via and I/O section. The compensation coefficient operation section determines a weight/phase compensation coefficient used for realizing both weight control and phase compensation control based on the phase estimate. A finger has a phase compensator. The phase compensator multiplies the demodulated signal after delay compensation by the determined weight/phase compensation coefficient. As a result, weight control and phase compensation control can be simultaneously attained. In this way, circuit scale can be reduced compared with the case in which weight control and phase compensation control are made individually via separate circuits.

6 Claims, 7 Drawing Sheets

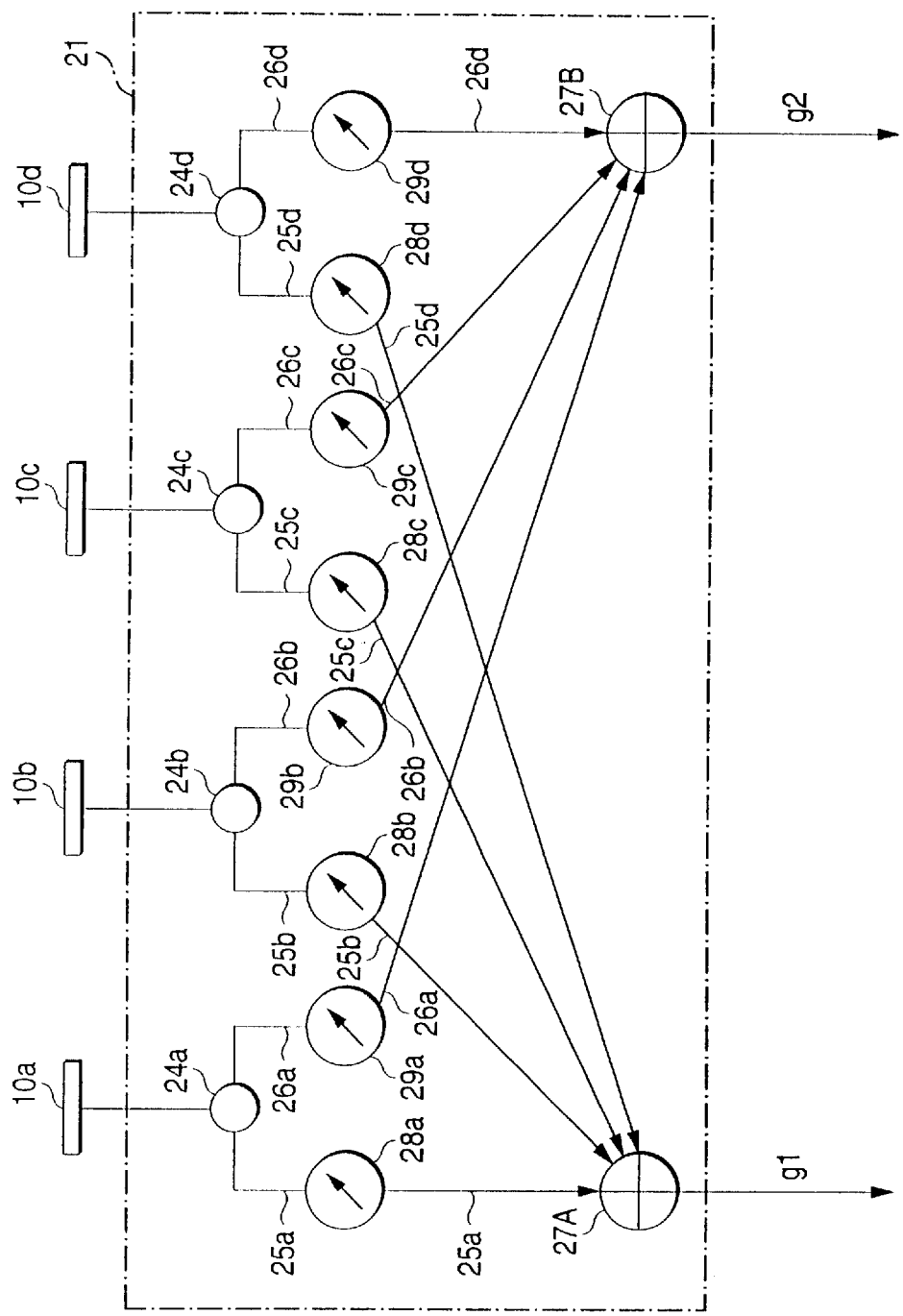

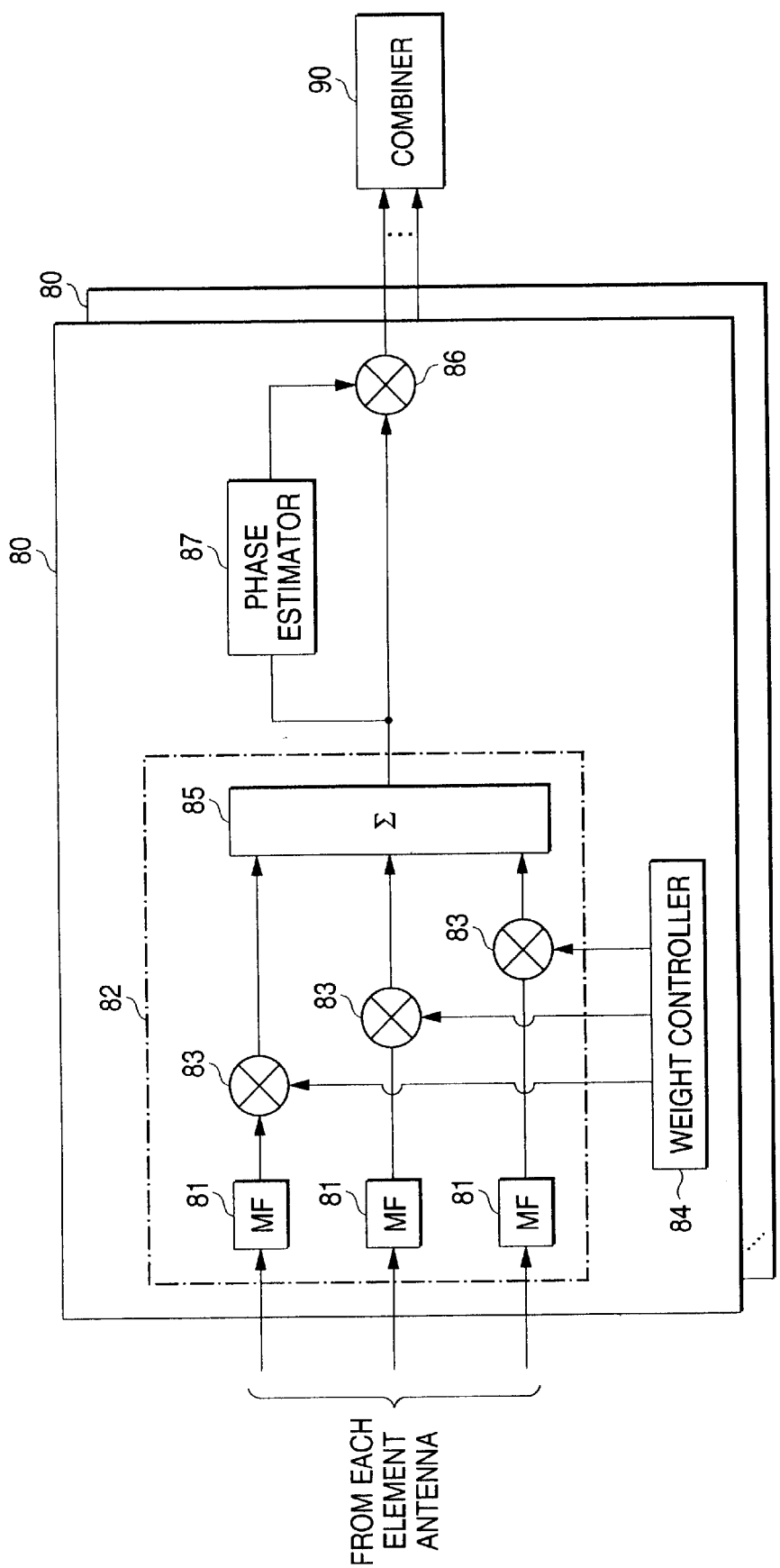

RECEIVER AND DEMODULATOR APPLIED TO MOBILE TELECOMMUNICATIONS SYSTEM

This application is a Continuation of International PCT Application No. JP98/05215 Filed on Nov. 19, 1998

BACKGROUND OF THE INVENTION

1. Field of the Invention

The present invention is applied to a base station of a cellular system which uses the CDMA (Code Division Multiple Access) as a communications access method and relates to a receiver which uses the DBF (Digital Beam Forming) for digitally executing signal processing as an antenna technology and a demodulator applied to such a receiver.

2. Discussion of the Background

In recent years, a method called the CDMA (Code Division Multiple Access) has been developed as a communications access method in the next-generation cellular system. In the CDMA system, a single frequency band is accessed by a plurality of users and distinction between users is made via user-specific codes.

According to a cellular system of the CDMA type, the same frequency band is shard by a plurality of users, thus improving the frequency use efficiency compared with the TDMA (Time Division Multiple Access) and FDMA (Frequency Division Multiple Access).

Recently, a further increase in subscriber accommodation is requested, considering a rapid increase in the number of subscribers in future. In order to satisfy this request, application of the CDMA is under examination. In this case, to make most of the CDMA features, it is required to suppress cochannel interference caused by the fact that the spreading codes of stations in the same cell are not orthogonal in a strict sense, and interference from a mobile station in another cell using the same frequency.

Thus, use of the Digital Beam Forming, hereinafter referred to as the DBF, for a cellular system of the CDMA type is under examination. The DBF performs weighed synthesis of signals received via a plurality of element antennas to orient the antenna beam (directivity) to the direction of desired waves or direct the null point of antenna to the direction of incoming unwanted waves.

The DBF can suppress the receiving power of the unwanted waves to a very small level, thus suppressing cochannel interference and adjacent channel interference. Thus, application of the DBF to a cellular system of the CDMA type can reduce interference amount within the same cell. This can relieve reduction of subscriber capacity caused by interference from another user.

A conventional example of configuration in which the DF is applied to a cellular system of the CDMA type is disclosed in "CHARACTERISTICS OF DIVERSITY ADAPTED FOR JUDGEMENT FEEDBACK TYPE COHERENT IN DS-CDMA, Tanaka et al., shinngaku giho, RCS-96–102 (1966-11)."

FIG. 7 is a block diagram of the internal configuration of a receiver disclosed in the aforementioned conventional document. This receiver is of a so-called element space type which executes weight control processing for controlling directivity. The receiver comprises a combiner 90 for performing synthesis of the output of a plurality of fingers 80 provided for a plurality of paths and each finger 80. Output of the combiner 90 is used for data decision.

The finger 80 has a matched filter (MF) 81. The matched filter 81 performs despreading of a digital output signal respectively corresponding to each element antenna to obtain a demodulated signal. The demodulated signal is given to a beam forming section 82. The beam forming section 82 has a plurality of weight operation sections 83.

Each weight operation section 83 multiplies a demodulated signal corresponding to each element antenna by a weight coefficient given by a weight controller 84. Output of each weight operation section 83 is synthesized by the synthesizer 85. As a result, a composite demodulated signal is generated. The composite demodulated signal is equivalent to a signal received via an antenna having a directivity showing a high receiving sensitivity to desired waves and a low receiving sensitivity to interference waves.

The composite demodulated signal is given to a phase compensator 86 as well as to a phase estimator 87. The phase estimator 87 determines a phase estimate based on the composite demodulated signal. The phase compensator 86 executes phase compensation control to compensate for fading on a propagation path on the composite demodulated signal, based on the phase estimate determined via the phase estimator 87. As a result, the phase of the composite demodulated signal is adjusted. The composite demodulated signal which has undergone the phase compensation are given to the combiner 90.

In the aforementioned technology, however, weight processing and phase compensation processing on the demodulated signal corresponding to each element antenna are made by separate circuits, that is, by the weight operation section 83 and the phase compensator 86 respectively. This resulted in a larger circuit scale.

SUMMARY OF THE INVENTION

An object of the invention is to provide a receiver which allows reduction of circuit scale, applicable to a mobile communications system and a demodulator provided in the receiver.

The invention to attain the object is a receiver applied to a mobile communications system, the receiver comprising an antenna, and A/D converter for converting antenna output signals from the antenna to digital signals, a path finder for finding a propagation path, a plurality of fingers which input digital signals output from the A/D converter, and a synthesizer for synthesizing output signals from the plurality of fingers, characterized in that the fingers comprise restoration means for performing despreading of a digital signal corresponding to the propagation path found by the path finder among digital signals output from the A/D converter to generate a demodulated signal, phase estimation means for determining a phase estimate based on a demodulated signal generated by the restoration means, and compensation means for multiplying the demodulated signal by a weight/phase compensation coefficient for simultaneously performing weight control and phase compensation control obtained based on the phase estimate determined via the phase estimation means to obtain an output signal for the finger.

The antenna preferably comprises a plurality of element antennas and preferably further comprise a restrained beam former for forming a plurality of sub-beams oriented to a plurality of directions and outputting a signal corresponding to each sub-beam as an antenna output signal. In this case, the A/D converter preferably converts an antenna output signal corresponding to each sub-beam output from the restrained beam former to a digital signal.

The antenna preferably comprises a plurality of element antennas and the A/D converter preferably converts an antenna output signal to a digital signal. In this case, restoration means, phase estimation means and compensation means included in the fingers are provided for each element antenna and correspond to each element antenna and preferably process a digital signal corresponding to a propagation path found via the path finder.

The invention is a demodulator provided in a receiver applied to a mobile communications system, the receiver comprising a feature to generate digital signals corresponding to antenna output signals, a feature to find propagation paths based on the antenna output signal, and a feature to synthesize finger output signals, the demodulator having a plurality of fingers, characterized in that the fingers comprise restoration means for performing despreading of a digital signal corresponding to the propagation path found by the path finder among digital signals output from the A/D converter to generate a demodulated signal, phase estimation means for determining a phase estimate based on a demodulated signal generated by the restoration means, and compensation means for multiplying the demodulated signal by a weight/phase compensation coefficient for simultaneously performing weight control and phase compensation control obtained based on the phase estimate determined via the phase estimation means to obtain an output signal for the finger.

According to the invention, weight control and phase compensation control are simultaneously performed via a single compensation means, based on a weight/phase compensation coefficient. Thus, circuit scale can be reduced compared with the case in which weight control and phase compensation control are made via separate circuits. This allows a lower-cost receiver to be provided.

Moreover, according to the invention, a receiver or a demodulator preferably further comprises a single compensation coefficient operator section for determining the weight/phase compensation coefficient in a time division fashion for each finger based on the phase estimate determined via the plurality of fingers, and giving each determined weight/phase compensation coefficient to each finger.

According to the invention, a plurality of weight/phase compensation coefficients used by fingers are determined by a single compensation coefficient operation section. Thus, circuit scale can be reduced compared with the case in which a compensation coefficient operation section is provided for each finger. This allows a further lower-cost receiver to be provided.

A more complete appreciation of the invention and many of the attendant advantages thereof will be readily obtained as the same becomes better understood by reference to the following detailed descriptions when considered in connection with the accompanying drawings, wherein:

BRIEF DESCRIPTION OF THE DRAWINGS

FIG. 3 is a circuit diagram showing the internal configuration of a multibeam former.

FIG. 7 is a block diagram showing the internal configuration of a conventional receiver in a base station.

DETAILED DESCRIPTION OF THE PREFERRED EMBODIMENTS

Figure 1:
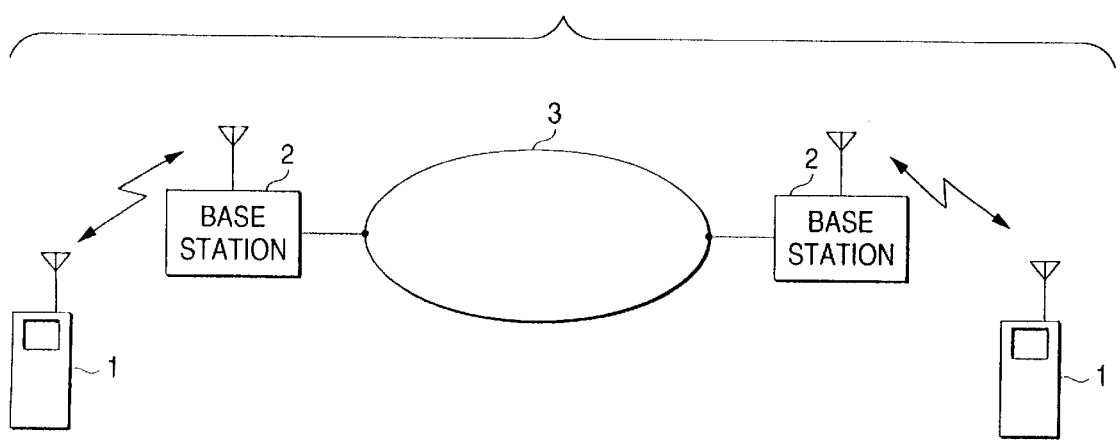
FIG. 1 shows a general configuration of a cellular system to which a receiver or a demodulator according to embodiment 1 of the invention is applied.

Referring now to the drawings, wherein like reference numerals designate identical or corresponding parts throughout the several views, and more particularly to FIGS. 1–6 thereof, there are illustrated exemplary embodiments of the present invention.

Embodiment 1

FIG. 1 is a schematic drawing showing the configuration of a cellular system to which a receiver or a demodulator according to the invention is applied. The cellular system uses the CDMA (Code Division Multiple Access) as a communications access method. The cellular system comprises a plurality of portable telephone sets 1, a plurality of base stations connected via radio links with portable telephone sets 1, and a communication circuit network 3 which connects a plurality of base stations 2 with each other via wired circuits. Each of the portable telephone sets 1 and base stations 2 comprises a transmitter and a receiver. This configuration allows the portable telephone set 1 to communicate with another portable telephone set 1 via a base station 2 and a communication circuit network 3.

Figure 2:
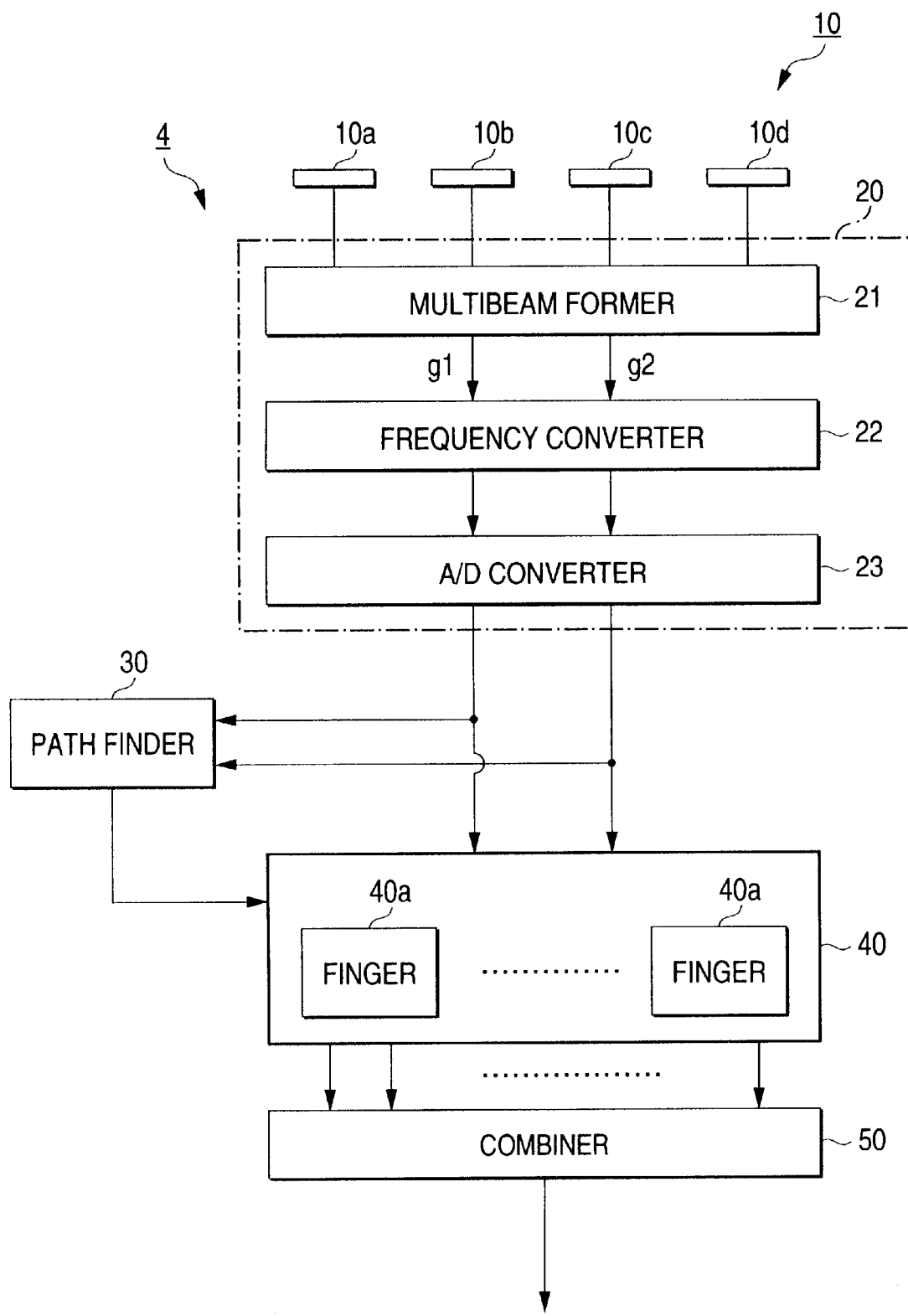
FIG. 2 is a block diagram showing the internal configuration of a receiver in a base station.

FIG. 2 is a block diagram showing the electrical configuration of the receiver in the base station 2. The receiver 4 in the base station 2 applies the DBF (Digital Beam Forming) as an antenna technology. That is, the receiver 4 has a configuration in which the DBF is applied to the CDMA. The receiver 4 is of a so-called beam space type and comprises an antenna 10, a restrained beam generator 20, a path finder 30, a demodulator 40 having n fingers 40a (where n is an integer, for example N=8) and a combiner 50.

The receiver 4 generates multibeams as beams of the antenna 10 via the restrained beam generator 20. The receiver 4 gives an antenna output signal of a valid path (valid propagation path) found via a path finder 30 to the demodulator 40. Further, the receiver 4 uses the demodulator 40 to apply weight control and phase compensation control to restore a demodulated signal. The receiver 4 obtains a RAKE composite signal equivalent to a final demodulated signal by using the combiner 50 to perform synthesis on the demodulated signal.

The antenna 10 comprises four element antennas 10a, 10b, 10c, and 10d. The four element antennas 10a through 10d are for example arranged in parallel on a plane. The restrained beam generator 20 generates multibeams as well as executes preprocessing for the demodulator 40. The restrained beam generator 20 comprises a multibeam former 21. The multibeam former 21 generates restrained beams including a plurality of sub-beams by adjusting the phase of each of antenna output signals from element antennas 10a through 10d.

FIG. 3 is a circuit diagram showing the internal configuration of the multibeam former 21. FIG. 3 assumes that two sub-beams are generated as restrained multibeams. The multibeam former 21 comprise four splitters 24a, 24b, 24c, and 24d connected to four element antennas 10a through 10d respectively. Splitters 24a through 24d are connected to one end of the first feed lines 25a, 25b, 25c and 25d, and the second feed lines 26a, 26b, 26c and 26d. The other end of each of feed lines 25a through 25d and 26a through 26d is connected to a first synthesizer 27a and a second synthesizer 27B.

The first feed lines 25a through 25d are interposed by first phase shifters 28a, 28b, 28c and 28d. The second feed lines 26a through 26d are interposed by second phase shifters 29a, 29b, 29c and 29d. The first phase shifters 28a through 28d and the second phase shifters 29a through 29d are have inherent phase shift amount. For example, the first phase shifters 28a through 28d have phase shift amount of exp (j3π/8), exp(jπ/8), exp(−jπ/8), and exp(−j3π/8), respectively. The second phase shifters 29a through 29d have phase shift amount of exp(−j3π/8), exp(−jπ/8), exp(jπ/8), and exp(j3π/8), respectively.

In this case, the first synthesizer 27A and the second synthesizer 27B generates antenna output signals g1 and g2 shown via expressions (1) and (2), respectively. Note that a1, a2, a3 and a4 represent antenna output from element antennas 10a through 10d respectively, in expressions (1) and (2) below.

$$g1 = \exp(j3\pi/8)xa1 + \exp(j\pi/8)xa2 + \exp(-j\pi/8)xa3 + \exp(-j3\pi/8)xa4 \quad (1)$$

$$g2 = \exp(-j3\pi/8)xa1 + \exp(-j\pi/8)xa2 + \exp(j\pi/8)xa3 + \exp(j3\pi/8)xa4 \quad (2)$$

As a result, the beam pattern of the antenna 10 is has two sub-beams SB1, SB2 of half-amplitude of 30 degrees arranged ±30 degrees respectively.

The multibeam former 21 is not limited to one which forms beams via analog processing but may be one which forms beams via digital processing. In this case, an A/D converter 23 as mentioned later is provided in the preceding stage of the multibeam former 21 and frequency conversion via a frequency converter 22 as mentioned later is digitally performed.

Referring to FIG. 2 again, the restrained beam generator 20 comprises the frequency converter 22. The frequency converter 22 converts the frequency of each of the two antenna output signals g1, g2 from a high frequency to an intermediate frequency. The frequency converter 22 has for example a low-noise amplifier, a Down converter, a bandpass filter, an AGC circuit and an amplifier. Antenna output signals after frequency conversion are given to an analog/digital converter (hereinafter referred to as "A/D converter") 23. The A/D converter 23 intermediate antenna output signals to digital signals.

The path finder 30 detects a propagation path carrying radio waves with a large receiving power as a valid path. More specifically, the path finder 30 detects power peaks and delay times for the power peaks, based on the pilot symbol contained in digital signals output from the A/D converter 23. After that, the path finder 30 extracts power peaks exceeding a predetermined threshold among detected power peaks. Thus, delay times corresponding to power peaks above the threshold values are obtained as valid paths.

The path finder 30 gives the determined valid path data (delay time data) to each finger of the demodulator 40. IN case the number of valid paths is equal to the number of fingers, the path finder 30 gives delay time data corresponding to each valid path to each finger 40a. In case the number of valid paths is larger than the number of fingers, the path finder 30 gives a piece of delay time data to more than on finger 40a.

Thus, the path finder 30 gives digital signals corresponding to valid paths alone to fingers 40a. This allows the fingers 40a to perform demodulation based on signals with large receiving power alone. This improves demodulation accuracy.

Figure 5:
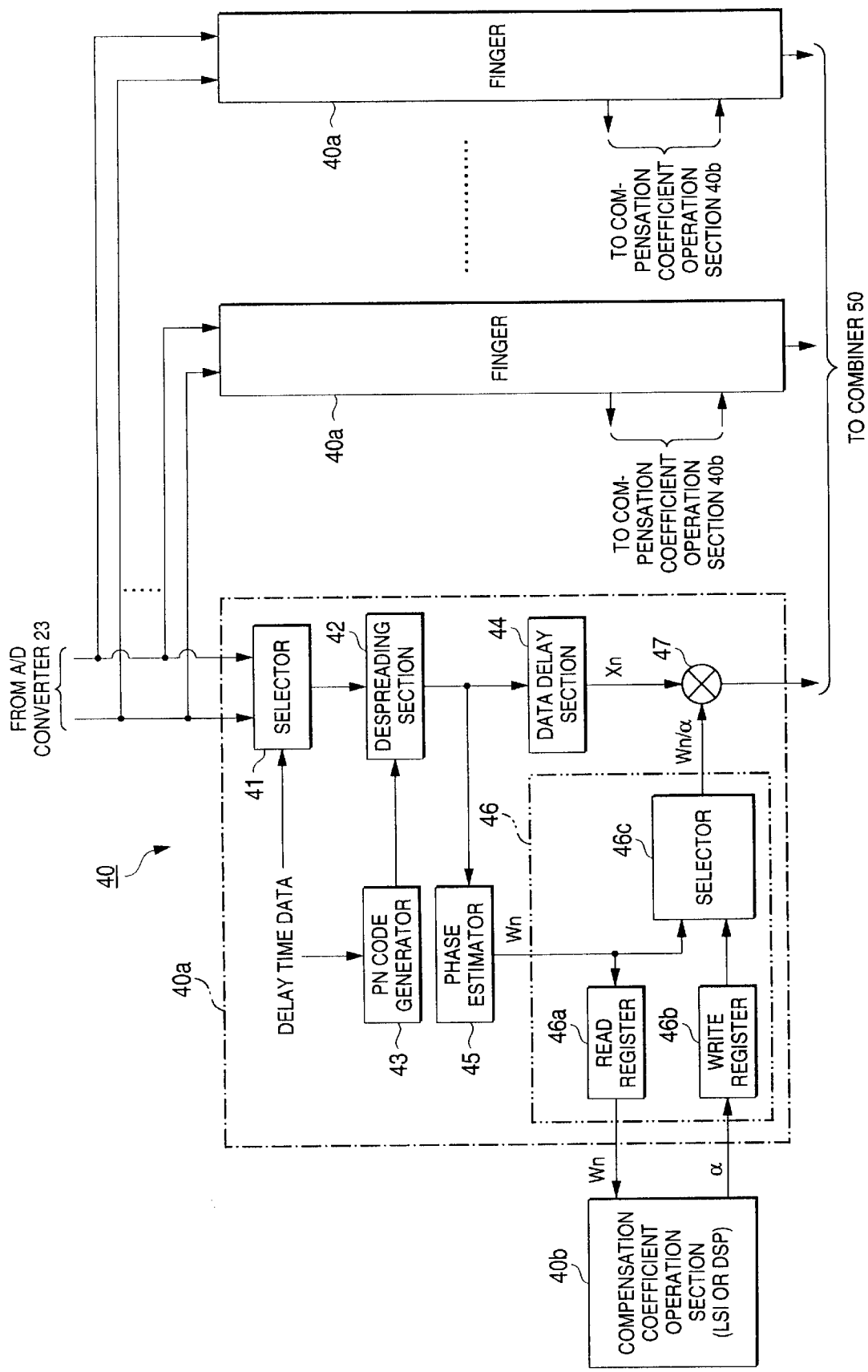
FIG. 5 is a block diagram showing the internal configuration of a demodulator.

FIG. 5 is a block diagram showing the internal configuration of a demodulator 40a. As mentioned earlier, the demodulator 40 has n fingers 40a. The internal configuration of each finger 40a is identical. A finger 40a is explained as an example.

The finger 40a comprises a selector 41. The selector 41 extracts a digital signal corresponding to delay time data given by the path finder 30 among digital signals output from the A/D converter. The extracted digital signal is given to a despreading section 42.

The finger 40a also comprises a PN code generator 43. The PN code generator 43 is adapted to be given delay time data by the path finder 30. The PN code generator 43 outputs PN codes at a timing delayed by the delay time specified by the delay time data, and gives the resulting PN codes to the despreading section 42.

The despreading section 42 multiplies a digital signal given by the selector 41 by PN codes output from the PN code generator 43. As a result, the digital signal is despreaded. This allows a demodulated signal to be obtained.

In this case, PN codes are given to the despreading section 42 at a timing corresponding to the delay time data. Accordingly, a demodulated signal obtained via despreading by the despreading section 42 has no time delay from other paths. Thus the demodulated signal with time delay from other paths canceled are given to a data delay section 44.

The data delay section 44 has a delay RAM (not shown). The data delay section 44 writes a demodulated signal given by the despreading section 42 into the delay RAM and reads the demodulated signal at a predetermined timing based on averaged number of slots to provide a demodulated signal with a delay for estimating the phase.

Specifically, a phase estimate as mentioned later is determined based on pilot signals on a plurality of slots. Thus, the data delay section 44 has a delay RAM with a capacity sufficient to make demodulated signal wait until the operation is complete, and delays the output timing of the demodulated signal by writing the demodulated signal to the delay RAM. The demodulated signal is read from the delay RAM on the basis of a symbol which has accommodated the difference of delay time> Accordingly, the read timing of a demodulated signal is synchronous between all fingers 40a. The data delay section 44 thus also has a feature to cancel time difference from other paths.

Digital signals on valid paths are dislocated in the phase region as well as the time region. Specifically, a digital signal on a valid path has a phase rotated by predetermined angle against the initial phase depending on the environment of propagation path. This causes fingers 40a to perform phase compensation.

More specifically, each of the fingers 40a has a phase estimator 45. The phase estimator 45 determines a phase estimate wn based on pilot signals on a plurality of slots for a demodulated signal. The determined phase estimate wn is given to an interface section (hereinafter referred to as the I/F section) 46.

The I/F section 46 acts as an interface used to connect fingers 40a and a compensation coefficient operation section 40b. Specifically, the I/F section 46 comprises a read register 46a and a write register 46b. The phase estimate wn is given to the read register 46a of the I/F section 46. The read register 46a gives the phase estimate wn to the compensation coefficient operation section 40b.

The compensation coefficient operation section 40b which is composed of a dedicated LSI or a dedicated DSP determines a weight/phase compensation coefficient α according to a predetermined operation program. The weight/phase compensation coefficient α is used to simultaneously realize weight control and phase compensation control. To be more specific about the operation processing, the compensation coefficient operation section 40b determines a weight coefficient wn' based on the phase estimate wn. Then the compensation coefficient operation section 40b executes the operation α=wn*wn' (where * means multiplication) via software to determine the weight/phase compensation coefficient α.

The compensation coefficient operation section 40b, shared by n fingers 40a, executes the compensation coefficient operation processing for each of the fingers 40a in a time division fashion. This eliminates the need for providing a compensation coefficient operation section for each of the fingers 40a. Thus, circuit scale of the finger 40 can be reduced compared with the case in which a compensation coefficient operation section is provided for each of the fingers 40a.

In the foregoing description, the phase estimate wn is determined via the phase estimator 45 provided on the finger 40. The finger 40 may not be provided with the phase estimator 45 so that the phase estimate wn can be determined via the compensation coefficient operation section 40b. In this case, demodulated signal obtained as a result of despreading is directly given to the read register 46a of the I/F section 46, and given to the compensation coefficient operation section 40b by the read register 46a.

According to this configuration, the finger 40 need not be provided with the phase estimator 45, thus further reducing the circuit size of the finger 40.

Afterwards, the compensation coefficient operation section 40b gives the determined weight/phase compensation coefficient α to the I/F section 46. The weight/phase compensation coefficient α is written to the read register 46b of the I/F section 46. The read register 46b gives the weight/phase compensation coefficient α to a selector 46c.

The selector 46c is given the phase estimate wn by the phase estimator 45 in addition to the weight/phase compensation coefficient α. The selector 46c selects the weight/phase compensation coefficient α given by the read register 46b in the DBF mode assumed in embodiment 1. Meanwhile, the selector 46c selects the phase estimate wn given by the phase estimator 45 in a mode other than the DBF mode. The selector 46c gives selected data to a phase compensator 47.

The phase compensator 47 is composed of a multiplier. The phase compensator 47 multiplies the demodulated signal xn after timing correction by the weight/phase compensation coefficient α. As a result, the phase of the demodulated signal xn is rotated by an angle according to the phase estimate wn. This eliminates the phase dislocation between paths, thus attaining phase compensation.

Figure 4A:
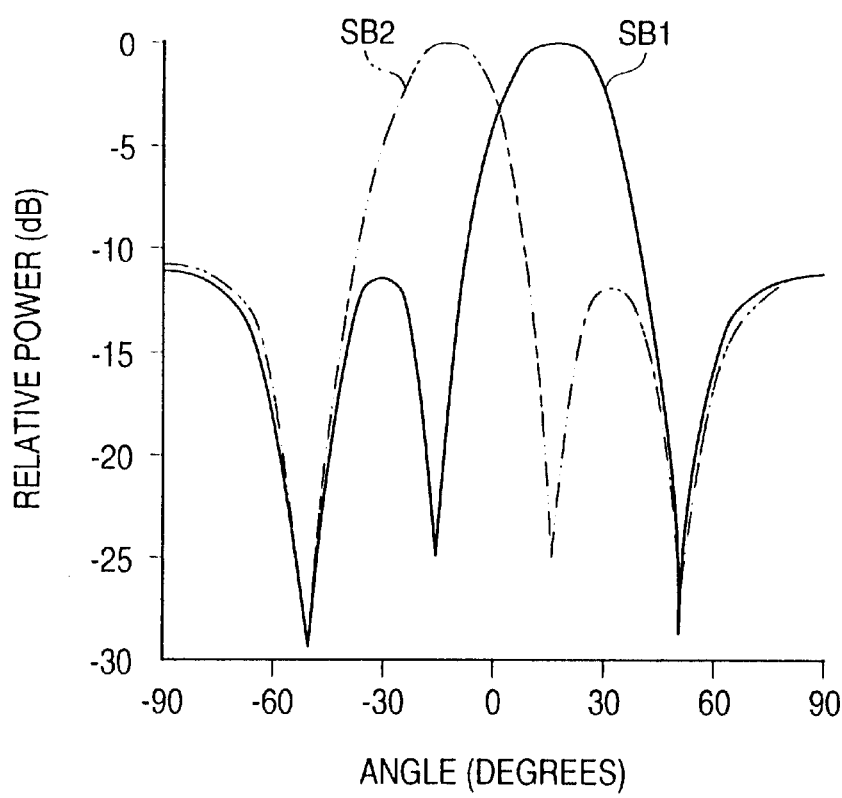
FIGS. 4A and 4B show beam patterns, respectively.
Figure 4B:
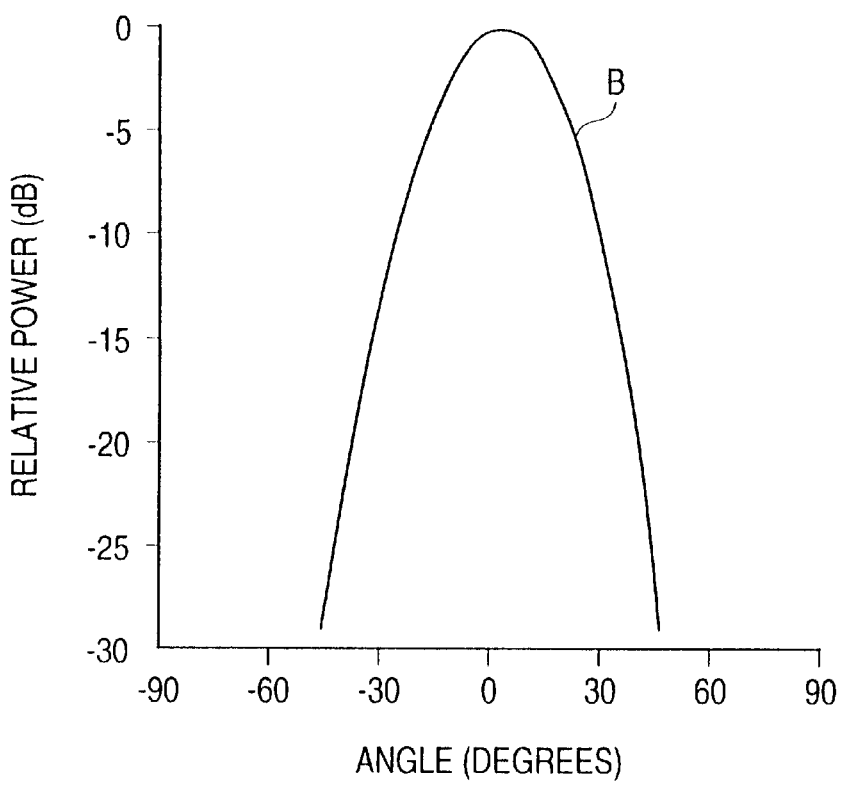

At the same time, weight control is applied to the demodulated signal xn. This processing is equivalent to form beams oriented to the direction of incoming radio waves which are original form of the demodulated signal xn. For example, beam patterns SB1 and SB2 as shown in FIG. 4A change into a single beam pattern B oriented to zero degrees as shown in FIG. 4B. This upgrades the S/N ratio of the demodulated signal. The demodulated signal which has undergone phase compensation and weight control are given to a combiner 50 as an output signal of each of the fingers 40a.

The combiner 50 is given finger output signals by a plurality of fingers 40a. The combiner 50 performs synthesis of each finger output signal. As a results, a RAKE composite signal equivalent to a final demodulated signal is generated. The RAKE composite signal is a synthesis result of a demodulated signal contained in radio waves propagated on valid paths, so that the RAKE composite signal shows a low bit error rate and can be used as valid data.

Thus, according to embodiment 1, weight control and phase compensation control are simultaneously executed via a single phase compensator 47, by multiplying the demodulated signal xn by the weight/phase compensation coefficient α. Thus, circuit scale can be reduced compared with the conventional case in which weight control and phase compensation control are made individually via separate circuits. This allows a lower-cost base station to be obtained.

Modification to algorithm is made easy because the weight/phase compensation coefficient α is determined via software. Accordingly, the weight/phase compensation coefficient α can be determined in a fashion suitable for the environment of the propagation paths of radio waves. This provides a more accurate weight control and phase compensation control.

Embodiment 2

Figure 6:
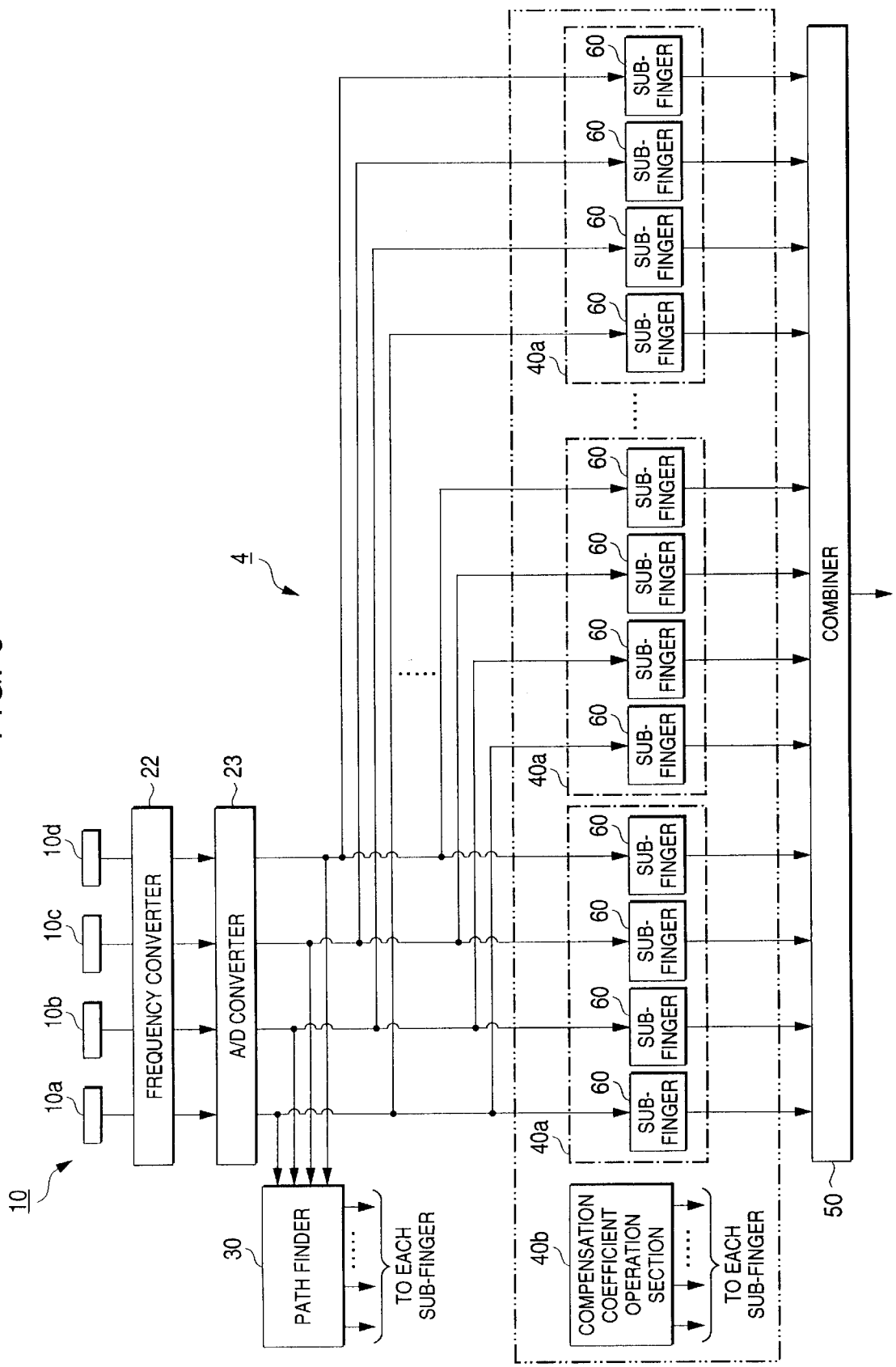
FIG. 6 is a block diagram showing the internal configuration of a receiver in a base station provided in a cellular system to which a receiver or a demodulator according to embodiment 2 of the invention is applied.

FIG. 6 is a block diagram showing the internal configuration of a receiver in a base station provided in a cellular system to which a receiver or a demodulator according to embodiment 2 of the invention is applied. In FIG. 6, the same signs are used for the same functional parts as those of FIGS. 2 and 5.

The embodiment 1 assumes a case in which the invention is applied to a beam space type receiver. Meanwhile, the embodiment 2 assumes a case in which the invention is applied to an element space type receiver.

Specifically, the receiver 4 in the base station 2 according to embodiment 2 converts antenna output signals from element antennas 10a through 10d from a high frequency to an intermediate frequency via the frequency converter 22. That is, the element space type receiver 4, unlike a beam space type receiver, separately processes antenna output signals from element antennas 10a through 10d.

Then, the antenna output signals after frequency conversion are converted to digital signals via the A/D converter 23. The digital signals are given to the path finder 30. The path finder detects valid paths based on the digital signals.

The digital signals are given to n fingers 40a respectively. Specifically, the digital signals corresponding to element antennas 10a through 10d are given to a plurality of sub-fingers 60 provided on a single finger 40a. Sub-fingers 60 are provided for elements antenna 10s through 10d. In embodiment 2, four sub-fingers 60 are provided on four element antennas 10a through 10d.

Each of the sub-fingers 60 has a configuration identical with the internal configuration of each of the fingers 40a shown in FIG. 5. In embodiment 2, antenna output signals from element antennas 10a through 10d corresponding to radio waves propagated via a single path are demodulated via different sub-fingers of a single finger 40a.

Specifically, each of the sub-fingers 60 applies weight control and phase compensation control using the weight/phase compensation coefficient α. In this case, the weight/phase compensation coefficient α is determined via the single compensation coefficient operation section 40b shared by all sub-fingers 60, same as embodiment 1.

The method in which weight control and phase compensation control are separately made on each of antenna output signals from a plurality of element antennas 10a through 10d is called the element space method.

Four finger output signals are output from a single finger 40a. Thus, 4xn finger output signals are output from all fingers 40a. The 4xn finger output signals are given to the combiner 50. The combiner 50 synthesizes the 4xn finger output signals to obtain a RAKE synthesis signal equivalent to a final demodulated signal.

Thus, according to embodiment 2, weight control and phase compensation control are simultaneously performed via the single phase compensator 47 also in the element space method. This reduces the circuit scale of fingers, same as the embodiment 1.

Other embodiments

While two embodiments of the invention have been described, it is clear that other embodiments of the invention is possible. The embodiments herein assume that the invention is applied to base stations. The invention may be easily applied to other mobile communication apparatus such as on-vehicle receivers.

What is claimed is:

1. A receiver applied to a mobile communications system, the receiver comprising:

an antenna;

an A/D converter for converting antenna output signals from the antenna to digital signals;

a path finder for finding a propagation path;

a plurality of fingers which input digital signals outputted from the A/D converter; and a synthesizer for synthesizing output signals from the plurality of fingers, wherein the fingers comprise restoration means for performing despreading of a digital signal corresponding to the propagation path found by the path finder among digital signals output from the A/D converter to generate a demodulated signal, phase estimation means for determining a phase estimate based on a demodulated signal generated by the restoration means, and compensation means for multiplying the demodulated signal by a weight/phase compensation coefficient for simultaneously performing weight control and phase compensation control obtained based on the phase estimate determined via the phase estimation means to obtain an output signal for the finger.

2. The receiver applied to a mobile communications system according to claim 1, wherein the antenna comprises a plurality of element antennas, the receiver further comprising a restrained beam former for forming a plurality of sub-beams oriented to a plurality of directions and outputting a signal corresponding to each sub-beam as an antenna output signal, wherein the A/D converter converts an antenna output signal corresponding to each sub-beam output from the restrained beam former to a digital signal.

3. The receiver applied to a mobile communications system according to claim 1, the antenna comprising a plurality of element antennas and the A/D converter converting an antenna output signal to a digital signal, wherein that restoration means, phase estimation means and compensation means included in the fingers are provided for each element antenna and correspond to each element antenna and process a digital signal corresponding to a propagation path found via the path finder.

4. A receiver applied to a mobile communications system according to claim 1, the receiver further comprising:

a single compensation coefficient operator section for determining the weight/phase compensation coefficient in a time division fashion for each finger based on the phase estimate determined via the plurality of fingers, and giving each determined weight/phase compensation coefficient to each finger.

5. A demodulator provided in a receiver applied to a mobile communications system, the receiver comprising:

a means for generating digital signals corresponding to antenna output signals;

a means for finding propagation paths based on the antenna output signal; and a means for synthesizing finger output signals, the demodulator having a plurality of fingers, wherein the fingers comprise restoration means for performing despreading of a digital signal corresponding to the propagation path found by the path finder among digital signals output from the A/D converter to generate a demodulated signal;

phase estimation means for determining a phase estimate based on a demodulated signal generated by the restoration means; and compensation means for multiplying the demodulated signal by a weight/phase compensation coefficient for simultaneously performing weight control and phase compensation control obtained based on the phase estimate determined via the phase estimation means to obtain an output signal for the finger.

6. The demodulator according to claim 5, wherein the demodulator further comprises:

a single compensation coefficient operator section for determining the weight/phase compensation coefficient in a time division fashion for each finger based on the phase estimate determined via the plurality of fingers, and giving each determined weight/phase compensation coefficient to each finger.

* * * * *